Sept. 4, 1951 J. C. FROMMER 2,566,699
CATHODE-RAY TUBE BRIDGE UNBALANCE DETECTOR
Filed April 30, 1948 2 Sheets-Sheet 1
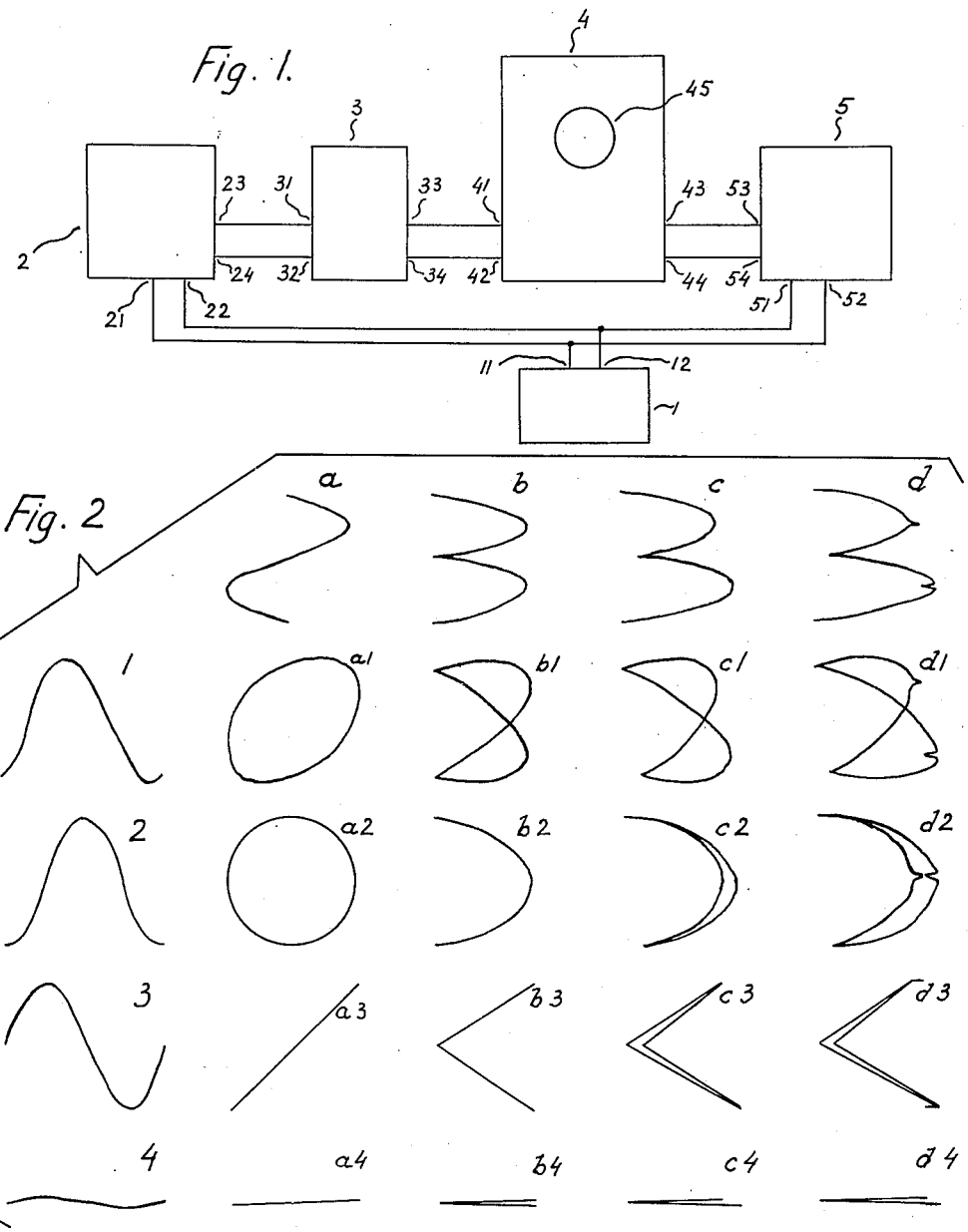
INVENTOR.
Joseph C. Frommer Sept. 4, 1951          J. C. FROMMER          2,566,699
CATHODE-RAY TUBE BRIDGE UNBALANCE DETECTOR
Filed April 30, 1948                                          2 Sheets-Sheet 2

INVENTOR.
Joseph C. Frommer

Patented Sept. 4, 1951

2,566,699

UNITED STATES PATENT OFFICE 2,566,699

CATHODE-RAY TUBE BRIDGE UNBALANCE DETECTOR

Joseph C. Frommer, Cincinnati, Ohio

Application April 30, 1948, Serial No. 24,185

3 Claims. (Cl. 171—95)

I have invented new and useful circuits to detect the presence or absence of alternating voltages and, more particularly, to supply deflection to cathode ray tubes used for such detection. My invention is especially suited for the indication of the balance of a Wheatstone bridge or of another circuit which is supplied at its input terminals with a certain alternating voltage and delivers at its output terminals a voltage of substantially the same frequency, which vanishes if the circuit elements in it are adjusted manually or automatically to certain values.

I will refer to all such circuits as A. C. bridges. I will refer to the absence of voltage at the output of such bridges as to balance. I will refer to the time elapsing during a full cycle of the alternating voltage applied to the input of the bridge as to 360°, and to proportions of this time as to proportionally smaller angles. Thus to the time interval of half a cycle as to 180° and so forth.

In many A. C. bridge circuits balance has to be obtained not only for equal magnitude, but also for equal phase of the A. C. voltage appearing across two adjacent arms of the bridge. If only the magnitude of the bridge output is indicated, we have no indication of whether the magnitude or the phase or both the magnitude and the phase of the voltage across one certain arm have to be changed, and in which direction they have to be changed to obtain balance. It is therefore advantageous to use a cathode ray tube unit, similar to those used commonly in studying alternating voltage phenomena, (to be called CR$t$ unit) for the detection of the bridge output, and to apply the output of the bridge to the signal terminals of the CR$t$ unit, and to apply an alternating voltage of the same frequency as the input to the bridge to the deflection terminals of the CR$t$ unit.

Then we obtain on the screen of the CR$t$, patterns as on sketches $a1$ to $a4$ of Fig. 2. If the phase of the output of the bridge is in phase with the input to the bridge and if we adjust the phase of the deflecting terminals to be exactly in phase with the input to the bridge, we obtain a straight slanting line (sketches $a3$ and $a4$). It is thus possible to first adjust the control that causes phase shift between two adjacent arms till the pattern is a straight line, and adjust afterwards the control that adjusts the proportion of the magnitudes of the two adjacent arms of the bridge till the pattern on the CR$t$ is a horizontal line. But for this first adjustment there is no indication in which direction adjustment must be made to approach balance, and the second adjustment does not give the highest possible accuracy because it is hard to tell a slightly slanting line (sketch $a4$,) from an exactly horizontal line, and if for the two best positions of a bridge with non-continuous adjustment, we get two slanting lines varying very minutely from each other, it is hard to interpolate between these two positions of the bridge the one at which the line would be rigorously horizontal.

It should be understood that in the above I assume that there is no amplification between the output of the bridge and the CR$t$. Actually such amplification will normally be used. It may be incorporated in the CR$t$ unit or may be done in a separate unit or both. It is possible to make such amplification to be exactly true in phase, i. e. that the output of it has exactly the same phase as its input. But usually such amplification will cause a certain amount of phase shift between its input and its output. In such case, whatever was said in the foregoing about the phase of the input to the bridge should be understood as to be said of a phase differing from that phase by the phase shift caused by the amplification between output of the bridge and the CR$t$.

One object of the invention is to provide a new and improved circuit to detect the presence or absence of alternating voltages at the output of alternating voltage bridge circuits.

Another object of the invention is to provide a deflecting circuit for above circuits.

Another object of the invention is to give a very exact indication of the balance of the bridge.

Another object of the invention is to allow interpolation between two readings that are close to but not exactly at the balance of the bridge.

Another object of the invention is to indicate at the absence of balance, in which direction adjustments have to be done to approach balance.

Another object of the invention is to give such indication for more than one variable simultaneously.

Another object of the invention is to give exact indication of the voltage difference between two momentary values of the bridge output, which are 180° apart for at least two pairs of such momentary values.

Another object of the invention is to give such simultaneous indication on one pair of momentary values approximately 180° apart from each other, and of another pair of momentary values approximately 180° apart from each other, the relative position of the two pairs being such that the phase angle between one member of one pair and one member of the other pair is approximately 90°.

Another object of the invention is to cause on the pattern drawn by the cathode ray tube, the abscissas of the points corresponding to the two members of said pairs to approximately coincide with each other.

Another object of the invention is to cause the abscissas corresponding to one of these pairs to assume the extreme position in one direction, the abscissas of the points corresponding to another of these pairs to assume the extreme position in the other direction.

Another object of the invention is to cause the abscissas corresponding to one of these pairs to assume the extreme position in one direction, the abscissas of the points corresponding to another of these pairs to assume the extreme position in the other direction, but leave a slight difference between the abscissas of two members of one pair, as a means of discriminating between these two members.

Another object of the invention is to provide on the pattern on the screen of the CRt two little tongues pointing toward each other for convenient reading of balance.

Another object of the invention is to provide a deflection input, the Fourier analysis of which contains a substantial proportion of the second harmonic of the input voltage to the bridge.

The invention should be better understood by referring to the drawings.

Fig. 1 is a block diagram of the complete circuit of an embodiment of the invention.

Fig. 2 shows the time curves of the deflecting voltage of equal frequency used in previous art, and of deflection voltages of substantially double this frequency, according to the present invention; the time curve of the bridge output voltage for different states of the bridge and the patterns obtained on the CRt screen by simultaneous application of said bridge output voltages to the signal input terminals of the CRt unit, and of the different said deflecting voltages to the deflection terminals of the CRt unit.

Figure 3:
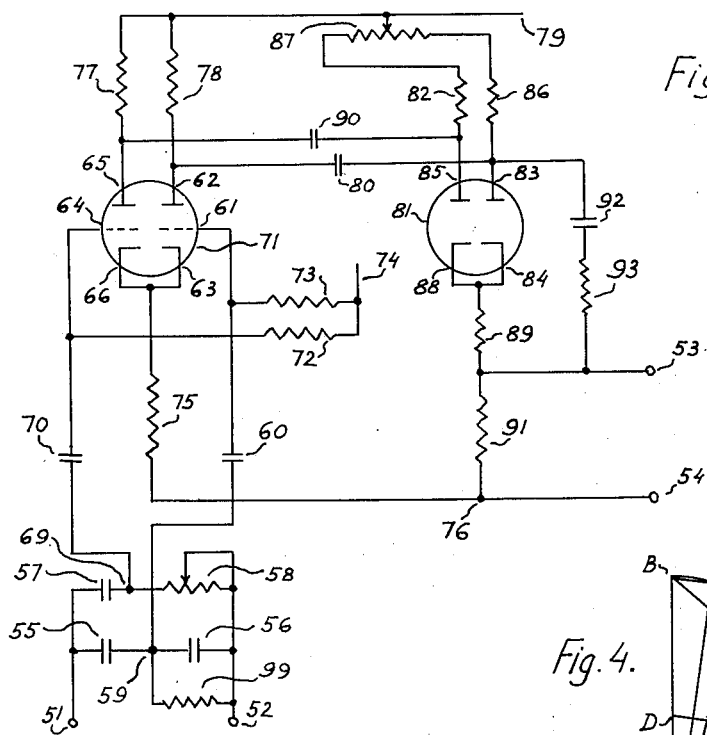
Fig. 3 represents a deflection circuit according to the invention.

On Fig. 1 reference numeral 1 denotes a source of alternating voltage which may be the 60 cycle power line or preferably an oscillator circuit providing a pure sine wave; 2 denotes a bridge the output of which is to be detected; 3 denotes an amplifier to detect the output of said bridge 2; 4 denotes a cathode ray tube unit comprising a cathode ray tube and the necessary supplies of anode and screen voltages, grid bias, heater, etc. voltages and which may or may not have a built in amplifier for amplifying the input applied to its terminals; 5 denotes a circuit which provides deflection voltage according to the invention.

In this circuit the alternating voltage provided by the source 1 on its terminals 11, 12 is supplied to the input terminals 21, 22 of the bridge 2. The output terminals 23, 24 of the bridge 2 are connected to the input terminals 31, 32 of the amplifier 3. The output terminals 33, 34 of the amplifier 3 are connected to the signal input terminals 41, 42 of the cathode ray tube unit 4. The output 11, 12 of the source 1 is also connected to the input terminals 51, 52 of the circuit 5. The output terminals 53, 54 of circuit 5 are connected to the deflection terminals 43, 44 of the cathode ray tube unit 4. The pattern to be observed will appear on the face of the cathode ray tube 45.

The luminous spot of the CRt will assume a position on the screen that is a function of the input applied to it on its terminals 41, 42, 43, 44. More particularly, in the CRt's used most commonly, the luminous spot will assume on this screen a point, one rectangular coordinate of which is determined in each moment of time by the momentary value of the voltage across terminals 41, 42, and the other coordinate of which is determined by the momentary value of the voltage across terminals 43, 44. (In most practical cases there is present some time delay or phase shift, but this can be held within limits within which it will not interfere with satisfactory operation.) We will refer to these two coordinates as to abscissa and ordinate of the spot, the coordinate depending on the deflecting terminals being called the abscissa, and the coordinate depending on the signal input terminals being called the ordinate.

If the signal furnished by the source 1 is a pure sine wave, and neither the bridge 2 nor the amplifier 3 cause harmonics of this wave, then the ordinate of the spot will assume values, the time curve of which for a period of 360° is given on sketches 1, 2, 3, 4 of Fig. 2. These are sine waves differing from each other in phase and magnitude.

Now if, according to present art, the input to the deflection terminals 43, 44 is a sine wave of the same frequency as that appearing on the input terminals 21, 22 of the bridge (see sketch a of Fig. 2), then the pattern appearing on the screen assumes the shape of sketches a1, a2, a3, a4. It is seen that these patterns obtained from prior art are ellipses that might degenerate into straight lines. For complete balance of the bridge we get a horizontal straight line.

(On these sketches, as well as on the following ones I drew, the abscissas [deflection] horizontally and the ordinates [bridge output] vertically, to adhere to present practice. But the pattern on the CRt must not necessarily be held in this position. In fact I found that I can read exact balance with less effort if I can place the abscissa [deflection] to be vertical.)

It is seen on the sketches a1 to a4 that the spot assumes each abscissa twice in the time interval of 360°. It assumes its middle position at the angles of 0° and 180°, its one extreme position at the angle of 90°, its other extreme position at the angle of 270°. It assumes an abscissa halfway between center and one extreme at 30° and 150°, and so on. It is seen that this type of deflection yields identical abscissas for two points 180° apart only once in each full cycle, namely for the points 0° and 180°. For all other portions of the pattern, the time interval between the moments corresponding to the points of identical abscissas are less: 0 for the extreme points, 150−30=120° for the point halfway between middle and one extreme abscissa, etc. Furthermore if such type of deflection is used, then the direction in which the main axis of the ellipse slants gives indication of the direction in which the bridge has to be adjusted to obtain a non-slanting ellipse. After once the main axis is brought into the horizontal position, there is no further indication in which direction the bridge has to be further adjusted. Still further, when we reached close to balance, it is hard to exactly discriminate a slightly slanting line from an exactly horizontal one which would indicate the exact balance.

Now, according to the invention, we generate in the deflecting circuit 5 an alternating voltage having among its Fourier components a substantial proportion of twice the frequency of the alternating voltage on points 11, 12. This deflecting voltage could be a pure second harmonic of the voltage across 11, 12, obtained in any way known to the art. In drawings Fig. 3 and Fig. 5 I represent circuits that generate a wave containing a substantial proportion of second harmonics but also other harmonics.

Figure 5:
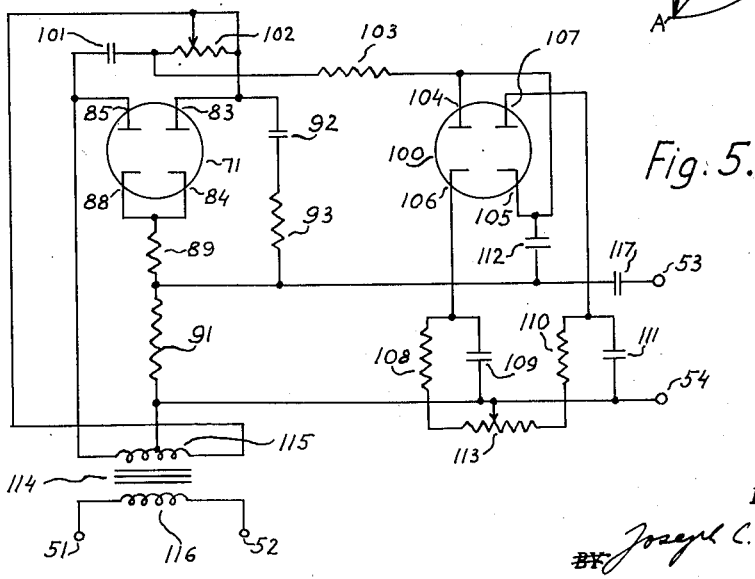
Fig. 5 represents another deflection circuit according to the invention.

In sketches b, c of Fig. 2 I represent the wave shapes obtained on terminals 53, 54 of Fig. 1 with the use of two modifications of the circuit of Fig. 3, and on sketch d I represent the waveshape obtained on terminals 53, 54 with the circuit of Fig. 5. The way of obtaining these time-curves with these circuits will be described in connection with those drawings. The patterns obtained with signal inputs at terminals 41, 42 as per sketches 1, 2, 3, 4 and with deflection input at terminals 43, 44 as per sketches b, c, d respectively, are given in sketches b1, b2, b3, b4, c1, c2, c3, c4, d1, d2, d3, d4.

The main advantage of deflecting signal as given in sketch b is that when we are close to balance, as in sketch b4, we get two lines forming a small angle with each other, and they will cover each other only when exact balance is obtained. Accordingly we get a very sharp and definite indication of even the slightest unbalance, because coincidence of two lines is a much sharper indication than exact horizontal position of one straight line. Further, if the bridge can not be adjusted continuously, this type of deflection allows to readily check the amount of out of balance from the vertical distance between the two lines on their extreme points, and to make interpolation between the two closest positions of the bridge.

But this deflection circuit does not indicate the direction in which the bridge has to be adjusted to approach balance. Therefore, as in sketches c and d, I introduce some of the fundamental or some higher harmonics to give positive discrimination between the two halves of the pattern that would else be entirely similar to each other. According to one embodiment of the invention I provide a deflecting time curve like given on sketch c, in which one extreme value of the abscissa in one direction differs slightly from the other extreme value of the abscissa in the same direction, and one extreme value of the abscissa in the other direction differs slightly from the other extreme value of the abscissa in this other direction. Accordingly the two half ellipses or straight lines appearing on the CRt screen will have different horizontal dimensions and can be told from each other. We will then know that if the longer right hand side peak is above the shorter right hand side peak we must adjust the control that influences the momentary values corresponding to these portions of the abscissa in one direction, and when it is below the shorter right hand side peak we must adjust this control in the opposite direction. And if the longer left hand side peak is above the shorter left hand side peak, the control that influences the momentary values corresponding to these portions of the abscissa has to be adjusted in one direction, and vice versa.

Sketch d represents the deflection time curve obtained with circuit diagram as per Fig. 5, and sketches d1, d2, d3, d4 represent the patterns obtained with this deflection. Here the lefthand side extreme values are discriminated as on sketch c by their different lengths, but the righthand side extreme positions are further discriminated from each other by two little tongues pointing toward each other.

Fig. 3 shows a deflection circuit which is adapted to generate a deflecting wave as per sketch b or c of Fig. 2. It comprises input terminals 51, 52, and output terminals 53, 54. Across its input terminals 51, 52 are connected, in series with each other, two capacitors 55, 56 of say 0.001 mf. each, 56 being shunted by resistor 99 of say 0.47 meg.; parallel to these, also in series to each other, are capacitor 57 of say 0.002 mf. and a variable resistor 58 of say 0.5 meg. The midpoint 59 between capacitors 55 and 56 is connected via a capacitor 60 of say 0.005 mf. to grid 61 of a twin triode 71, say a 6SN7 tube. The midpoint 69 of the series connection 57, 58 is connected via capacitor 70 of say 0.005 mf. to the other grid 64 of said twin triode 71. Grids 61 and 64 are connected further across resistors 72 and 73 of say 2.2 meg. each to a point 74, which is held at say +150 volts D. C. above point 76. The cathodes 63 and 66 are connected with each other and connected across resistor 75 of say 0.047 meg. to the negative terminal 76 of the B-supply of the circuit. Plates 65, 62 are connected via resistors 77, 78 of say 0.047 meg. each to the positive terminal 79 of the B-supply, which may supply say +300 volts with respect to its negative terminal 76. Plates 62 and 65 are further connected via capacitors 80, 90 of say 0.01 mf. each to plates 85, 83 of twin diode 81, say a 6H6 tube. These plates are further connected via resistors 82, 86 of say 4.7 meg. each to the two ends of an adjustable potentiometer 87 of say 2 megs., which has its tap connected to the positive terminal 79 of the B supply. The two cathodes 88, 84 of the twin diode 81 are connected to each other and via the series connection of resistor 89 of say 0.1 meg. and 91 of say 0.33 meg. to the negative terminal 76 of the B supply. The two cathodes 88, 84 of the twin diode 81 are connected to the output terminal 53 across resistor 89. The output terminal 54 is connected to the negative terminal 76 of the B supply. The output terminal 53 is further connected to one of the diode plates 83 via the series connection of resistor 93 of say 2.2 meg. and capacitor 92 of say 0.000, 1 mf.

Figure 4:
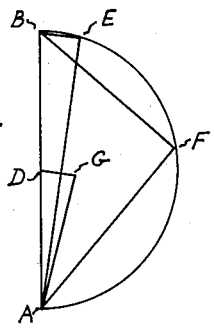
Fig. 4 shows the vector diagram of the alternating voltage applied to the twin amplifier tube represented in Fig. 3.

If we apply to input terminals 51, 52 an A. C. voltage of say 15 volts R. M. S. and 1 kc. frequency, we would obtain between point 59 and either point 51 or 52 a voltage which is in phase with the A. C. voltage across these two points, if we omitted resistor 99. Furthermore, if capacitor 55 is equal to capacitor 56, these two voltages are equal to each other. Their vectors are represented by BD and AD of Fig. 4, where the vector of the A. C. voltage between points 51 and 52 is represented by AB. Between point 69 and either points 51, 52, we will obtain A. C. voltages with 90° phase shift toward each other. These vectors can be represented by EB and EA, FB and FA, or the two lines drawn from any other point of arc AFE, corresponding to the setting of the variable resistor 58. It is possible to vary the resistance of this resistor continuously to zero, but it can be varied upwards only till a certain finite value corresponding say to point E on the arc. Therefore somewhat less than 180° phase shift can be obtained for the vector drawn from point D to a point of the arc AFE. Now by addition of resistor 99 the point in the vector diagram of Fig. 4 corresponding to point 59 of Fig. 3 will be shifted from D to G. It is seen that the vectors drawn from point G to the different points of arc AFE do cover more than 180°, allowing to adjust any desired phase angle between the voltage applied to the grids of 71 against the voltage of the source applied to points 51, 52. (By selecting the capacitors 60, 70 sufficiently high, the voltage vectors on grids 64, 61 will be substantially equal to the voltage vectors on points 59, 69.)

By supplying to point 74 a voltage substantially more positive than the negative terminal of the B supply, the potential of the cathodes 63, 66 will be held at a voltage approximately equal to (actually slightly higher than) this voltage on point 74. If now two different A. C. voltages are impressed on grids 61, 64, with amplitudes substantially below the voltage across 75, then the current in this resistor will vary only relatively slightly during the entire cycle and only the distribution of this current in the two triode systems will vary according to the difference between the momentary values of these two A. C. voltages. But then we obtain on plates 62, 65 two A. C. voltages that are substantially equal but in opposite phase to each other and whose phases are equal and opposite to the phase of the voltage between the two grids. These voltages of opposite phase to each other are transmitted via capacitors 80, 90 to the plates 83, 85 of the twin diode 81. This twin diode will conduct a current which is mainly determined by the voltage between the positive terminal 79 and the negative terminal 76 and by the resistances of 91, 89, 82, 86 and 87. Conduction of the current will take place across that one of the two diode systems the plate of which is more positive. The two cathodes being connected to each other will assume a voltage below and close to the voltage of the more positive of 83, 85. The waveshape on this point will therefore be like sketches b and c of Fig. 2. The A. C. voltage on plates 65 and 62 will usually not be exactly equal and in exactly opposite phase. A certain amount of asymmetry is desirable in order to obtain the waveshape of sketch c. The degree of asymmetry can be kept in desired limits by mixing a proportion of the voltage obtained on cathodes 84, 88 with a voltage derived from either of the plates 83 or 85. To this effect the output terminal is connected to the midpoint of resistors 89, 91 and connected via resistor 93 and capacitor 92 to plate 83. By proper choice of the ratio between these circuit elements and connecting 92 to 83 or 85, the desired increase or decrease is symmetry can be obtained. To equalize the current flow between 82 and 86 (so that the current flows to each diode plate for exactly 180°) potentiometer 87 can be adjusted.

Another circuit to provide deflection according to the invention is given in Fig. 5. On this figure the phase shift circuit has been omitted because it can be similar to that used in Fig. 2 or any other phase shift circuit used in the art. Shown are transformer 114 with a primary 116 and a secondary 115, two twin diodes 71 (say a 6 x 5 tube) and 100 (say a 6H6 tube). The plates 85, 83 of the first twin diode 71 are connected to the two terminals of the secondary 115, which may furnish say 2 × 250 volts R. M. S. 60 cycle voltage. The two cathodes 84, 88 are connected together and via resistors 89 (of say 0.75 meg.) and 91 (of say 0.1 meg.) to the midpoint of secondary 115. The cathode 105 and anode 104 of the second twin diode 100 are interconnected with each other and connected via resistor 103 of say 0.1 meg. to the midpoint between capacitor 101 of say 0.0125 mf. and adjustable resistor 102 of say 0.5 meg. The other cathode 106 and other anode 107 of the twin diode 100 are connected via parallel combination of capacitance and resistance to the midpoint of the secondary 115. The capacitances are capacitors 109, 111 of say 0.67 mf. each; the resistances are resistors 108, 110 of say 0.1 meg. each and portions of potentiometer 113 of say 0.1 meg. One output terminal 54 is connected to midpoint of secondary 115; the other output terminal 53 is connected via capacitor 117 of say 0.05 mf. to the midpoint of resistors 89, 91 and to one end of capacitor 112 of say 0.001 mf., the other terminal of which is connected to the cathode 105 and plate 104 of diode 100, and also via resistor 93 and capacitor 92 to one terminal of secondary 115.

The primary 116 of transformer 114 is connected to an A. C. voltage of the frequency supplied to the input of the bridge, say 115 volts, 60 cycles. Consequently we obtain on the two terminals of the secondary 115 two A. C. voltages of equal magnitude and opposite polarity of this same frequency. The positive half of each of these A. C. voltage waves is transmitted to the cathodes 88, 84, but the negative half is withheld from them. We therefore obtain on these cathodes a waveshape as indicated on sketches b and c of Fig. 2. The required amount of symmetry or asymmetry can be secured by proper choice of 92, 93. Resistor 102 is adjusted to have equal impedance to capacitor 101, and we will consequently obtain on their midpoint an A. C. voltage having 90° phase shift with respect to the voltages in the secondary 115. This voltage is impressed across resistor 103 to the two sections of twin diode 100 in opposite polarity. If the time constant of combination of 108 and 109 and of 110 and 111 (together with the respective portions of 113) is high compared to one cycle of the A. C., then the voltages on the cathode 106 and anode 107 of the diode 100 will stay practically constant and the diode will clip off that portion of the A. C. voltage appearing at the midpoint between 101 and 102, which falls outside the upper voltage limit appearing on cathode 106 and the lower voltage limit appearing on anode 107. We therefore obtain on cathode 105 and anode 104 a voltage curve close to a square wave, with its vertical portions exactly at the phase of the peak of the voltage across 115. If now the time constant of the combination of capacitor 112 and resistors 89, 91 and whatever other resistors are connected to this point is small compared to the duration of one cycle, then we will obtain on the midpoint of resistors 89, 91 a voltage surge of short duration at each vertical portion of the square wave. These voltage surges added to the voltage curve of sketch c will cause a voltage curve as per sketch d of Fig. 2. This voltage shape is transmitted to output terminal 53 via capacitor 117.

As the time constants on cathode 106 and anode 107 have to be long compared to one cycle, and the time constant in midpoint between 89 and 91 has to be short compared to one cycle this second time constant has to be low compared to that first time constant.

The proper phase relation between input to the bridge and input to primary of 114 can be obtained by any means used in the art for this purpose. But it is equally possible to provide for the necessary amount of phase shift in the amplifier between bridge and CRt unit (3 on Fig. 1). Most phase shift circuits provide for less than 180° phase shift. This can be extended in various ways. One is shown on Fig. 3. Another is to provide two separate phase shift circuits in the same or in different portions of the circuits, each of which by itself gives less than 180°, but which combined with each other give a total phase shift or more than 180°. One of them can then also provide coarse adjustment of phase and the other fine adjustment of it.

The examples given should not be regarded as the only possible embodiments of the invention, and the numerical values given as examples for voltages, resistances, capacitances should not be regarded as necessary limitations to obtain the objects of the invention. They are merely given to indicate orders of magnitude and the second digits are given not to suggest that these values are critical, but because I prefer to give values which I happen to use in my experiments.

I claim:

1. A circuit comprising an A. C. bridge having a pair of input terminals and a pair of output terminals, a cathode ray tube unit having a pair of signal input terminals and a pair of deflection terminals, a first source of alternating voltage, a second source of alternating voltage which supplies an alternating voltage the waveshape of which has two upper extreme values and two lower extreme values during each cycle of the alternating voltage supplied by said first source of alternating voltage two extreme values in at least one direction being different from each other, the input terminals of said A. C. bridge being connected to said first source of alternating voltage, the output terminals of said A. C. bridge being connected to said signal input terminals of said cathode ray tube unit, and said second source of alternating voltage being connected to said deflection terminals of said cathode ray tube unit.

2. A circuit according to claim 1, in which the two extreme values, in at least one direction, of the voltage supplied by the second source of alternating voltage, are substantially at an angle of 180° of the cycle of the first source with respect to each other.

3. A circuit comprising: an A. C. bridge having a pair of input terminals and a pair of output terminals; a cathode ray tube unit having a pair of signal input terminals and a pair of deflection terminals; a source of alternating voltage; a deflecting circuit having a pair of input terminals, a first output terminal, a second output terminal and two diode systems; the first output terminal of said deflecting circuit being connected to two identical electrodes of said two diode systems, through circuit elements the impedance of which is small compared to the impedance of said deflection terminals the other two identical electrodes of said two diode systems being connected to two points held on alternating voltages of the frequency of said source and having opposite phase relationship and different amplitude with respect to said second output terminal, said source of alternating voltage being connected to said input terminals of said A. C. bridge, said output terminals of said A. C. bridge being connected to said signal input terminals of said cathode ray tube unit, and said two output terminals of said deflecting circuit being connected to said two deflection terminals of said cathode ray tube unit.

JOSEPH C. FROMMER.

REFERENCES CITED

The following references are of record in the file of this patent:

UNITED STATES PATENTS

| Number | Name | Date |
|---|---|---|
| 2,162,009 | Goldsmith | June 13, 1939 |
| 2,244,513 | Burton | June 3, 1941 |
| 2,271,964 | Wilson | Feb. 3, 1942 |
| 2,280,531 | Norgaard | Apr. 21, 1942 |
| 2,328,985 | Luck | Sept. 7, 1943 |
| 2,428,021 | Grieg | Sept. 30, 1947 |
| 2,455,321 | Stolze et al. | Nov. 30, 1948 |